United States Patent Office 3,043,788
Patented July 10, 1962

3,043,788
RAPID DRYING EPOXY-ESTER METAL LITHO FINISHES
Wilbur Lee Bressler, Lake Jackson, and Wayne E. Presley, Freeport, Tex., assignors to The Dow Chemical Company, Midland, Mich., a corporation of Delaware
No Drawing. Filed Oct. 2, 1958, Ser. No. 764,745
5 Claims. (Cl. 260—18)

The present invention relates to metal litho finishes and is more particularly concerned with new compositions of matter which are useful as metal litho finishes.

The present day metal litho finish compositions lack physical and/or chemical properties, even where several different types of coatings are used, to withstand, without fracture, the severe working to which the coated metal is subjected when making, for example, a crown cap. The present day compositions usually take the form of first a tin-plate, then a baked primer coat, a baked color coat and finally a clear finish coat. These various coatings, even when expertly applied, often result in unsatisfactory coatings having fractures in the surfaces resulting in poor corrosion resistance and poor organoleptic properties. Further, when foods are in contact with these coatings, even without fracture, the coatings are very likely to impart a characteristic odor to the food or drink. In addition the multiple coating technique is expensive and time-consuming. Various attempts have been made by the industry to remedy the defects of the present systems. However, little or no success has been achieved.

It is therefore an object of the present invention to provide a single composition useful as a metal litho coating which has in some suitable measure the combined properties of each of the various coatings now employed.

It has now been discovered that a single coating metal litho finish can be prepared by incorporating a metallic drier and a small amount of tertiary amine into a modified polyhydroxy epoxy resin and then esterifying it with a drying oil fatty acid. The so-prepared resin dries very rapidly with excellent adhesive and organoleptic properties. The metallic drier, such as soluble iron, zinc, lead, manganese, or cobalt salts, can be employed in amounts as little as 1 part per million (p.p.m.), but is preferably employed in amounts of from 1 to 10 p.p.m. When the drier is employed in amounts above 25 p.p.m., the coating tends to crinkle, though this is not considered to be detrimental, since the physical and chemical properties are not materially affected and there are applications wherein the artistic crinkled effect is desirable. Some applications of the crinkle finish are interior finishes on automobiles, such as window frames and dash boards, the cases covering electrical and electronic instruments, and the like.

Substantially any tertiary amine can be employed in accordance with the present invention. The amine can be employed in an amount of from 0.02 to 0.2 percent by weight and preferably from about 0.050 to about 0.10 percent by weight based on total charge. Increasing the amount of amine increases the reaction time, and conversely, decreasing the amount of tertiary amine decreases the reaction time. However, as the amount of amine is decreased, the reaction time is shortened and the reaction mass exhibits a tendency to gel becoming no longer useful as a finish vehicle.

The metallic driers which are useful are the oil-soluble salts of iron, lead, manganese, cobalt and/or zinc. The color of the finished epoxy-ester vehicle will depend to a great extent upon the specific drier employed. Iron usually results in darker vehicles than the other driers; however, purity of the drier is also material to the final color.

The epoxy resins which are employed herein are the commercially available types which have been modified by reaction with a hydroxyl-containing compound to a molecular weight in the range of from 800 to 2900. These can be prepared in the manner well known in the art.

Substantially any polyunsaturated long chain fatty acid can be employed, such as linoleic, linolenic, elaeosteric, clupanodonic or preferably the mixed acids derived from drying or semidrying oils, such as dehydrated castor-, soya-, linseed-, sunflower-, cottonseed-, oiticica-, tung-, tall-oil fatty acid and the like.

The following examples illustrate the present invention but are not to be construed as limiting.

*Example I*

Into a reaction vessel equipped with a means for stirring and temperature control were charged 45 parts of bisphenol A and 100 parts of diglycidyl ether of bisphenol A having an approximate molecular weight of 350. The temperature of the reaction vessel was raised to 120° C. and maintained thereat until a clear solution was obtained. Thereafter the reaction vessel and contents were cooled to 70° C. and 0.075 percent by weight of N-methylmorpholine and 2 p.p.m. manganese were added thereto. The manganese was in form of 10.5 percent manganese salt solid (sold under the trade name Uversol by the Harshaw Chemical Company) dissolved in xylene. The mixture was then pumped through a coil reactor, maintained at 170° C. to obtain a product having a Duran melting point of from 95 to 103° C.

60 parts of the above product were then mixed with 40 parts of dehydrated castor oil (a fatty acid of dehydrated castor oil) and heated to a temperature of 260° C. and held thereat for 2 hours. At the end of 2 hours the viscosity of the finished product was Y–Z as determined in a mixture consisting of 55 percent product and 45 percent mixed solvent (11.3 percent diacetone alcohol and 88.7 percent Solvesso 100 which is a high purity kerosene).

*Example II*

The following table lists the rating for esters prepared as in Example I by esterifying 60 parts of epoxy resin having a melting point of 100° C. with 40 parts of dehydrated castor oil (a fatty acid of dehydrated castor oil). It is to be noted that the drier was added to each before esterification. However, the drier can be added after esterification, provided that a tertiary amine is also added.

The accepted test is to paint a metal panel with a 0.5 mil coating, dry for 10 minutes at 150° to 200° C. and then subject the panel to a pressure of 7 pounds per square inch at 50° C. for 18 hours. This test stems from the fact that a dry stack of finished material exerts a pressure of approximately 7 pounds per square inch on the lower members. A rating of no tackiness is necessary to insure commercial operability.

| Example | Drier | Rating |
| --- | --- | --- |
| II | None | Tacky. |
| VI | 1 p.p.m. Mn | No tackiness. |
| VIII | 2 p.p.m. Mn | Do. |
| X | 5 p.p.m. Mn | Do. |
| XI | 10 p.p.m. Mn | Do. |
| XII | 1 p.p.m. Co | Do. |
| XIII | 5 p.p.m. Co | Do. |

The composition of Example 1 was employed to coat a sheet of metal and the metal was thereafter drawn into crown caps which showed no cracking after forming.

We claim:
1. A modified epoxy ester product, produced by the reaction of an epoxy resin having a molecular weight of from 800 to 2900, and containing from 1 to 25 p.p.m. metallic drier and from 0.05 to 0.2 percent tertiary amine, with a polyunsaturated long-chain fatty acid.

2. A modified epoxy ester product, produced by the reaction of an epoxy resin having a molecular weight of from 800 to 2900, and containing of from 1 to 10 p.p.m. manganese and 0.075 percent N-methyl morpholine, with dehydrated castor oil fatty acid.

3. A process for producing an epoxy-ester metal finish which comprises reacting an epoxy resin having a molecular weight of from 800 to 2900, and containing from 1 to 25 p.p.m. metallic drier and from 0.05 to 0.2 percent N-methylmorpholine, with a polyunsaturated long chain fatty acid, applying said epoxy-ester metal finish to metal, and drying.

4. A process for producing a modified epoxy-ester metal finish which comprises reacting a modified epoxy resin having a molecular weight of from 800 to 2900 and containing of from 1 to 10 p.p.m. manganese, and 0.075 percent N-methyl-morpholine with dehydrated castor oil fatty acid, applying said epoxy ester metal finish to metal, and baking.

5. A process according to claim 4 wherein the drier is cobalt.

References Cited in the file of this patent
UNITED STATES PATENTS

| | | |
|---|---|---|
| 2,695,894 | D'Alelio | Nov. 30, 1954 |
| 2,867,591 | Lederman | Jan. 6, 1959 |